(12) United States Patent
Laberge Lebel et al.

(10) Patent No.: US 10,913,220 B2
(45) Date of Patent: Feb. 9, 2021

(54) PULTRUDED BEAM REINFORCED WITH NATURAL FIBERS, PULTRUSION SYSTEM AND METHOD THEREFOR

(71) Applicant: POLYVALOR, LIMITED PARTNERSHIP, Montréal (CA)

(72) Inventors: Louis Laberge Lebel, Montreal (CA); Philippe Monnot, Laval (CA); Arnold Oswald, Montreal (CA); Felix Lapointe, Montreal (CA)

(73) Assignee: POLYVALOR, LIMITED PARTNERSHIP, Montreal (CA)

( * ) Notice: Subject to any disclaimer, the term of this patent is extended or adjusted under 35 U.S.C. 154(b) by 0 days.

(21) Appl. No.: 16/311,581

(22) PCT Filed: Jun. 22, 2017

(86) PCT No.: PCT/CA2017/050762
§ 371 (c)(1),
(2) Date: Dec. 19, 2018

(87) PCT Pub. No.: WO2017/219143
PCT Pub. Date: Dec. 28, 2017

(65) Prior Publication Data
US 2019/0193346 A1 Jun. 27, 2019

Related U.S. Application Data

(60) Provisional application No. 62/353,873, filed on Jun. 23, 2016.

(51) Int. Cl.
*B29C 70/52* (2006.01)
*C08F 10/06* (2006.01)
(Continued)

(52) U.S. Cl.
CPC ............ *B29C 70/528* (2013.01); *B29C 70/52* (2013.01); *B29C 70/523* (2013.01);
(Continued)

(58) Field of Classification Search
CPC ..... B29C 70/528; B29C 70/52; B29C 70/527; B29C 70/526; B29C 70/523; C08L 97/02;
(Continued)

(56) References Cited

U.S. PATENT DOCUMENTS 5,073,413 A * 12/1991 Koppernaes .......... B29B 15/122
261/102
2003/0062118 A1* 4/2003 Gerhard .............. B29C 35/0272
156/274.4
(Continued)

FOREIGN PATENT DOCUMENTS

WO 2015/002951 A2 1/2015
WO WO-2015002951 A2 * 1/2015 ........... B29C 70/523

*Primary Examiner* — Joseph S Del Sole
*Assistant Examiner* — Jamel M Nelson
(74) *Attorney, Agent, or Firm* — Norton Rose Fulbright Canada LLP (57) ABSTRACT

A system for pultruding a beam, such as a pultruded beam of natural fibers, comprises a pulling mechanism continuously pulling on a preform of yarns including a thermoplastic matrix and fibers, the pulling mechanism being downstream of the system. A sequence is provided in the system and has a pre-heating module to pre-heat the preform. A first die has a tapering channel portion heated such that the preform reaches a desired low viscosity temperature for resin in the thermoplastic matrix to impregnate the fibers. A vacuum module has a vacuum cavity to remove air from the preform exiting the first die. A second die has a tapering channel portion heated such that the preform is at the desired low viscosity temperature for resin in the thermoplastic matrix to further impregnate the fibers. A cooling module to
(Continued)

cool the beam before the beam reaches the pulling mechanism. A system for pultruding beams is also provided.

12 Claims, 11 Drawing Sheets (51) Int. Cl.
| | |
|---|---|
| *C08G 63/08* | (2006.01) |
| *C08J 5/04* | (2006.01) |
| *C08L 23/12* | (2006.01) |
| *C08L 97/02* | (2006.01) |
| *B29K 101/12* | (2006.01) |
| *B29K 23/00* | (2006.01) |
| *B29K 67/00* | (2006.01) |
| *B29K 307/04* | (2006.01) |
| *B29K 309/08* | (2006.01) |
| *B29K 311/10* | (2006.01) |
| *B29L 31/00* | (2006.01) |

(52) U.S. Cl.
CPC .......... *B29C 70/526* (2013.01); *B29C 70/527* (2013.01); *C08F 10/06* (2013.01); *C08G 63/08* (2013.01); *C08J 5/042* (2013.01); *C08J 5/043* (2013.01); *C08L 23/12* (2013.01); *C08L 97/02* (2013.01); *B29K 2023/10* (2013.01); *B29K 2067/046* (2013.01); *B29K 2101/12* (2013.01); *B29K 2307/04* (2013.01); *B29K 2309/08* (2013.01); *B29K 2311/10* (2013.01); *B29L 2031/001* (2013.01); *C08J 2323/12* (2013.01); *C08J 2367/04* (2013.01); *C08L 2205/16* (2013.01)

(58) Field of Classification Search
CPC ............ B29K 2101/12; B29K 2311/10; B29K 2309/08; B29K 2307/04; B29K 2067/046; B29K 2023/10; B29L 2031/001
See application file for complete search history.

(56) References Cited

U.S. PATENT DOCUMENTS

| | | |
|---|---|---|
| 2006/0144504 A1 | 7/2006 | Edwards |
| 2015/0118152 A1 | 4/2015 | Ganatra et al. |
| 2018/0257318 A1* | 9/2018 | Orange ................ B29C 70/523 |

* cited by examiner

FIG. 11

PULTRUDED BEAM REINFORCED WITH NATURAL FIBERS, PULTRUSION SYSTEM AND METHOD THEREFOR

CROSS-REFERENCE TO RELATED APPLICATION

The present application claims the priority of U.S. Patent Application Ser. No. 62/353,873, filed on Jun. 23, 2016 and incorporated herein by reference.

TECHNICAL FIELD

The present application relates to a pultrusion system and to a method for pultruding beams using natural fibers or synthetic fibers, and the resulting pultruded beam reinforced by natural fibers or synthetic fibers.

BACKGROUND OF THE ART

Studies on pultrusion using natural fibers and/or bio-sourced matrices have demonstrated that biocomposite parts can be highly valuable for their mechanical properties, price and environmental benefits. In pultrusion, yarns of reinforcement fibers are fed into the system from a creel. Thermosets are added using a resin bath. Thermoplastics are fed into the system parallel to the reinforcement fibers or injected as melted pellets. When they are fed into the system parallel to the reinforcement fibers, they can be in the form of parallel yarns, comingled fibers, powder impregnated fibers or pre-impregnated tapes. Fibers and resin pass through a heated die of a certain cross-section shape. For thermoplastics, a tapered die entrance and resin overfilling are used to ensure pressure build-up for impregnation. A cooling system is added to prevent deconsolidation. The beam is pulled by a mechanism controlling the process speed.

Pultrusion is a scalable and continuous process producing complex cross-section profiles. Therefore, its economic advantages for mass production add up to those of biocomposites. Since impregnation of the fibers is difficult when using high viscosity thermoplastics, thermoset polymers are commonly used for pultrusion. However, a shift toward thermoplastic matrices is promising because of their high toughness, chemical resistance, recyclability and their ability to be post formed.

While natural fibers and thermoplastics are attractive for pultrusion, their respective uses face difficulties. Above 200° C., natural fibers may gradually start to thermally degrade. This may prevent the possibility of using high process temperatures. As thermoplastics' viscosity is a major obstacle to good impregnation quality, process temperatures may need to be increased to reduce the viscosity of a given thermoplastic, which conflicts with the natural fibers degrading at higher temperatures. Thus, while it can be difficult to use natural fibers or thermoplastic matrices in pultrusion, there are even more challenges in using both. Accordingly, in known attempts to pultrude thermoplastic biocomposites, studies reported either high void contents (higher than 10%), presence of unimpregnated areas, or unmelted resin regions.

SUMMARY

It is an aim of the present application to provide a method for pultruding beams using natural or synthetic fibers that addresses issues related to the prior art.

It is a further aim of the present disclosure to provide a novel pultruded beam of natural fibers.

Therefore, in accordance with a first embodiment of the present disclosure, there is provided a pultruded beam comprising a thermoplastic matrix reinforced with natural fibers impregnated with the thermoplastic, the pultruded beam having a void percentage lower than 10% of an overall volume of the pultruded beam, and further wherein the natural fibers constitute between 40% and 60% of the overall volume of the pultruded beam.

Further in accordance with the first embodiment, the thermoplastic matrix is for instance a polylactic-acid matrix.

Still further in accordance with the first embodiment, the thermoplastic matrix is for instance a polypropylene matrix.

Still further in accordance with the first embodiment, the natural fiber are for instance flax fibers.

In accordance with a second embodiment of the present disclosure, there is provided a pultruded beam comprising a thermoplastic matrix reinforced with synthetic fibers impregnated with the thermoplastic, the pultruded beam having a void percentage lower than 10% of an overall volume of the pultruded beam, and further wherein the synthetic fibers constitute between 40% and 60% of the overall volume of the pultruded beam.

Further in accordance with the second embodiment, the thermoplastic matrix is for instance a polylactic-acid matrix.

Still further in accordance with the second embodiment, the thermoplastic matrix is for instance a polypropylene matrix.

Still further in accordance with the second embodiment, the synthetic fibers are for instance at least one of glass fiber and carbon fiber.

In accordance with a third embodiment of the present disclosure, there is provided a method for pultruding a beam comprising: continuously pulling on a preform of yarns including a thermoplastic matrix and fibers; while continuously pulling, sequentially pre-heating the preform, passing the preform through a first die having a tapering channel portion heated such that the preform reaches a desired low viscosity temperature for resin in the thermoplastic matrix to impregnate the fibers, passing the preform in a vacuum cavity to remove air therefrom, passing the preform through at least a second die having a tapering channel portion heated such that the preform is at the desired low viscosity temperature for resin in the thermoplastic matrix to further impregnate the fibers to output a beam, and cooling the beam.

Further in accordance with the third embodiment, continuously pulling on the preform of yarns comprises for instance pulling on the beam after the cooling to cause a continuous pull of the preform of yarns.

Still further in accordance with the third embodiment, pulling on the beam comprises for instance passing the beam through at least a pair of roller on opposite sides of the beam.

Still further in accordance with the third embodiment, pre-heating the preform includes for instance passing the preform in a contactless heater.

Still further in accordance with the third embodiment, pre-heating the preform includes for instance passing the preform through a contact heater in which the preform contacts at least one heating element.

Still further in accordance with the third embodiment, passing the preform through a contact heater in which the preform contacts at least one heating element includes for instance sliding the preform against cylindrical heating elements.

Still further in accordance with the third embodiment, passing the preform through at least one of the first die and the second die includes for instance passing the preform through the tapering channel portion tapering in a range of 2° to 6° from a central axis of the die.

Still further in accordance with the third embodiment, passing the preform through at least one of the first die and the second die includes for instance passing the preform through a straight channel portion downstream of the tapering channel portion.

Still further in accordance with the third embodiment, passing the preform through the first die and through the second die comprises for instance passing the preform through a smaller channel in the second die than in the first die.

Still further in accordance with the third embodiment, the method is for instance performed using for the fibers natural fibers.

Still further in accordance with the third embodiment, the method is for instance performed using for the fibers synthetic fibers.

Still further in accordance with the third embodiment, the method is for instance performed using one of polylactic-acid matrix and a polypropylene matrix as thermoplastic matrix.

In accordance with a fourth embodiment of the present disclosure, there is provided a system for pultruding a beam comprising: a pulling mechanism continuously pulling on a preform of yarns including a thermoplastic matrix and fibers, the pulling mechanism being downstream of the system; and a sequence of a pre-heating module to pre-heat the preform, a first die having a tapering channel portion heated such that the preform reaches a desired low viscosity temperature for resin in the thermoplastic matrix to impregnate the fibers, a vacuum module having a vacuum cavity to remove air from the preform exiting the first die, at least a second die having a tapering channel portion heated such that the preform is at the desired low viscosity temperature for resin in the thermoplastic matrix to further impregnate the fibers, and a cooling module to cool the beam before the beam reaches the pulling mechanism.

Further in accordance with the fourth embodiment, the pulling mechanism comprises for instance at least a pair of roller on opposite sides of the beam.

Still further in accordance with the fourth embodiment, the pre-heating module includes for instance a contactless heater.

Still further in accordance with the fourth embodiment, the pre-heating module includes for instance a contact heater in which the preform contacts at least one heating element.

Still further in accordance with the fourth embodiment, the contact heater has for instance cylindrical heating elements against which the preform is put in contact.

Still further in accordance with the fourth embodiment, at least one of the first die and the second die has for instance a taper in a range of 2° to 6° from a central axis of the tapering channel portion.

Still further in accordance with the fourth embodiment, at least one of the first die and the second die includes for instance a straight channel portion downstream of the tapering channel portion.

Still further in accordance with the fourth embodiment, the system has for instance a channel smaller in cross-section in the second die than in the first die.

Still further in accordance with the fourth embodiment, a downstream portion of the first die and an upstream portion of the second die are for instance in sealing engagement with the vacuum module to seal the vacuum cavity.

Still further in accordance with the fourth embodiment, the system comprises for instance N of the dies for N−1 of the vacuum module, wherein N=at least two.

Still further in accordance with the fourth embodiment, the yarns of fibers is for instance in the system, with the fibers being natural fibers.

In accordance with a fifth embodiment of the present disclosure, there is a use of the system as described above to pultrude a preform of yarns including a thermoplastic matrix and fibers into a pultruded beam.

DETAILED DESCRIPTION

The present disclosure describes an enhanced impregnation quality of thermoplastic biocomposites pultruded parts through several changes to the conventional pultrusion system setting. Firstly, the use of a vacuum chamber removes residual air inside the strand. Secondly, the use of a second pultrusion die to further impregnate fibers is considered, regardless of vacuum chamber use.

Figure 1:
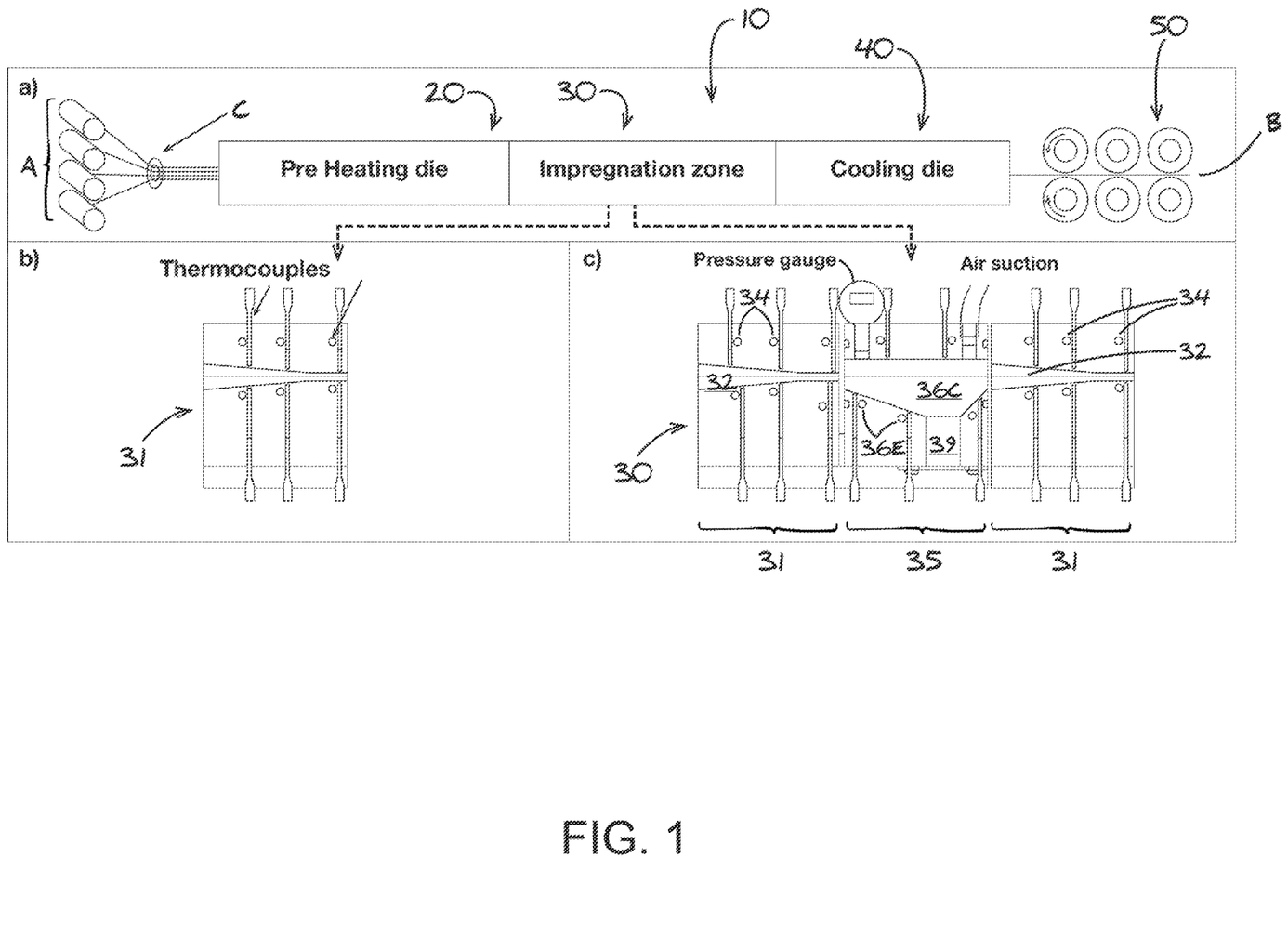
FIG. 1 is a schematic view of a pultrusion system operating a method in accordance with the present disclosure.
Figure 2:
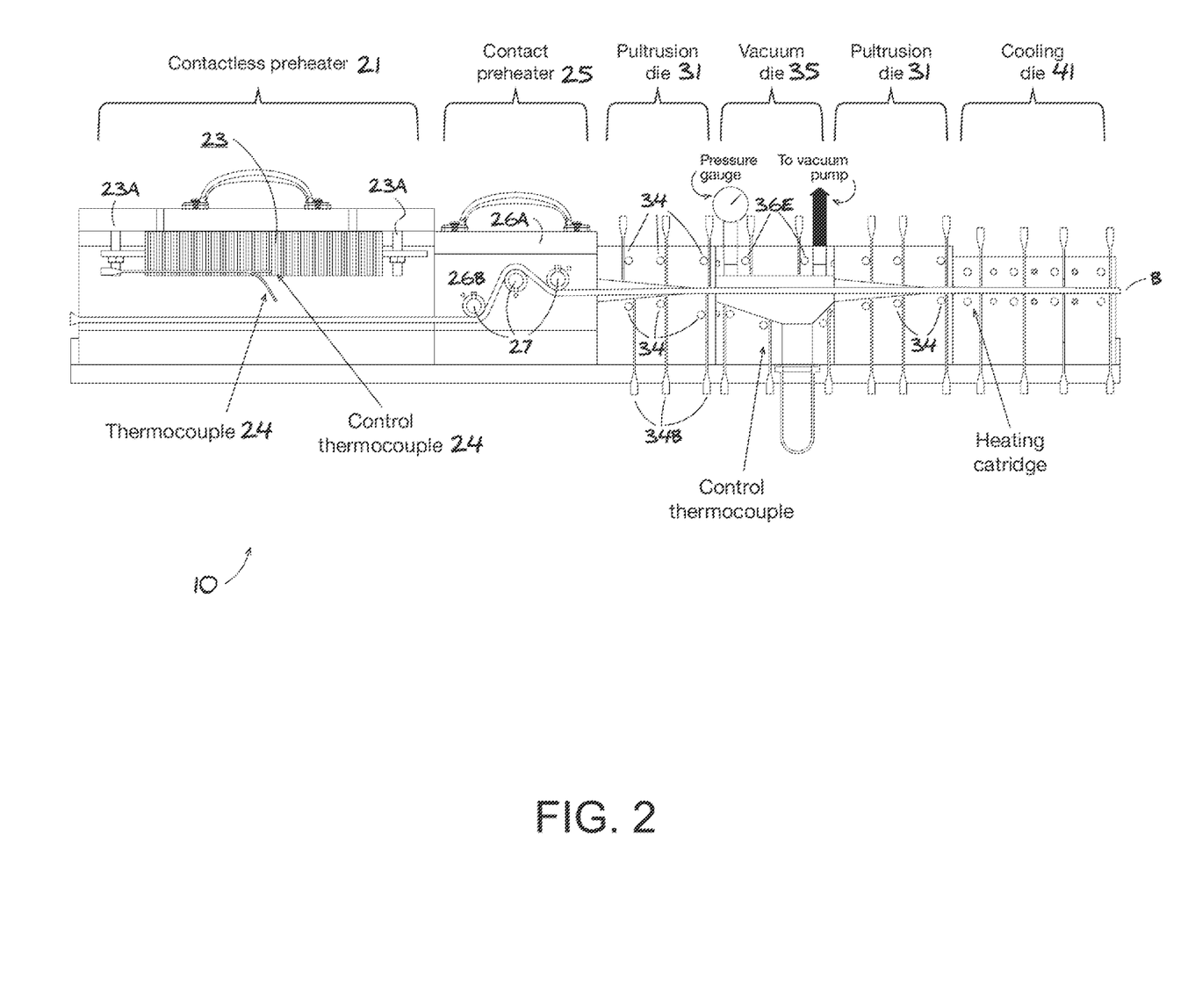
FIG. 2 is a schematic side view of part of the pultrusion system of FIG. 1.

Referring to the drawings and more particularly to FIGS. 1 and 2, there is illustrated a pultrusion system 10 to operate a method for pultruding beams B including natural fibers in accordance with the present disclosure. The method therefore uses a preform of yarns A including a thermoplastic resin forming the matrix of the beam, and natural fibers used as reinforcement. However, even though the method is suited for the addition of natural fibers, it is considered to use synthetic fibers as well. As an example, the method and system 10 may use polylactic-acid (PLA) matrix as one of the yarns A, and a flax yarn as another one of the yarns A. For example, the PLA yarns may be trilobal 180 tex spun by Applied Polymer Innovations (from 4032D, NatureWorksLLC). This is one possible thermoplastic that may be used, as other thermoplastics, such as polypropylene, may be used as well, for other natural fibers. Flax is a natural fiber that is well suited for being part of the present pultruded beam, due to its relatively low lignin content for high cellulose content, enabling higher process temperatures. Other natural fibers that may be used as well include hemp fibers and jute fibers, or mixes of natural fibers. Synthetic fibers can be used as well, such as glass fibers, carbon, etc, as well as mixtures of natural and synthetic fibers. The number of yarns A is determined by a nominal fiber volume content of 40%. Other materials that may be used for the yarns A include commingled yarns of carbon fibers and polyamide fibers (Dualon, Karijene Inc., Japan; Lexter, Mitsubishi Gas Chemical Inc., Japan).

Different types of yarn precursors can be used such as powder impregnated yarns where the reinforcing fibers are filled with polymer powder. Another type of precursor is a pre-impregnated tape where a fixed amount of reinforcement fibers are impregnated by a polymer. Other kind of yarns where the reinforcement fibers are mixed with the polymer can be used. Various arrangements are considered to feed the yarns to the system 10, such as having polymer yarns and reinforcement yarns on different spools, or as part of a parallel hybrid yarn. As another embodiment, comingled yarns of polymers and reinforcing fibers may also be used. As another embodiment, the reinforcement fibers may be sheath coated with a polymer sheath. As another embodiment, polymer fibers may be part of microbraided yarns.

In an embodiment, yarns A are fed from a creel into the system 10. A ring C may be used to ensure all yarns are aligned before entering the system 10. Yarn precursors are wound onto multiple spools and placed onto the creel. Yarns are tensioned by adjusting the friction between the spools and the creel. This tension keeps the yarns straight before they enter the pultrusion modules of the system 10.

The pultrusion system 10 may have a pre-heating module 20, an impregnation module 30, a cooling module 40, and a pulling mechanism 50 at the outlet of the cooling module 40 to exert the pulling action on the pultruded beam exiting from the cooling module 40. The various components of the modules 20, 30, and 40 of the system 10 may be arranged in a modular fashion, for example along rails to facilitate their handling and relative positioning and alignment.

The pre-heating module 20 is used to pre-heat the yarns A entering the system 10, gradually and uniformly, to avoid the degrading of the preform due to an abrupt temperature increase.

The impregnation module 30 is used for the impregnation of the natural fibers or synthetic fibers in the thermoplastics, to form a hot consolidated pultruded beam.

The cooling module 40 cools the hot pultruded beam at the exit of the impregnation module 30.

The pulling mechanism 50 is located at the outlet of the cooling module 40 to exert the pulling action on yarns A, becoming the pultruded beam B exiting from the cooling module 40.

Figure 3:
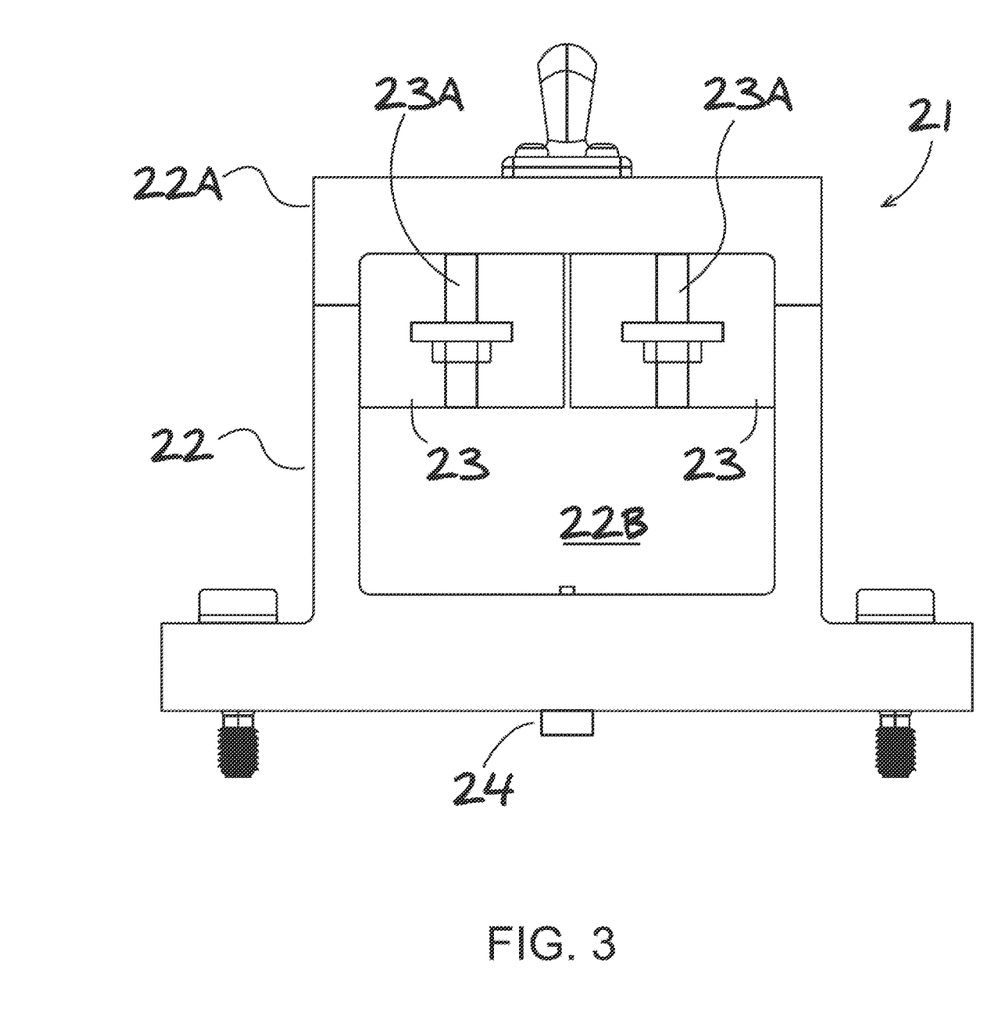
FIG. 3 is an end view of a contactless heater of a pre-heater module of the pultrusion system of FIG. 1.
Figure 4:
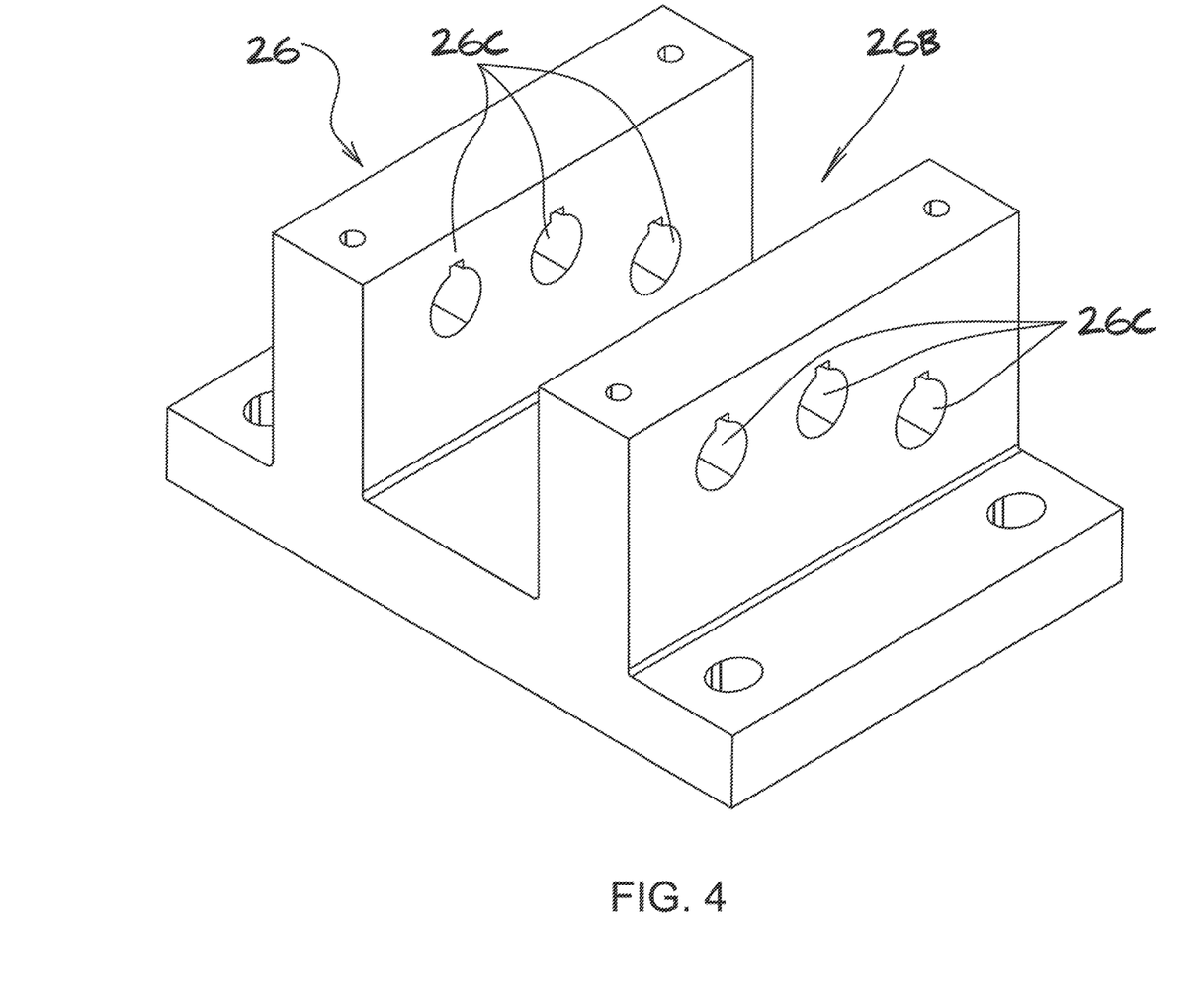
FIG. 4 is a perspective view of a casing of a contact heater of the pre-heater module of the pultrusion system of FIG. 1.

Referring to FIGS. 2-4, the pre-heating module 20 may have two sub-modules. An upstream sub-module is a contactless preheater 21 as shown in FIGS. 2 and 3. The contactless preheater 21 is at the inlet of the system 10, and therefore receives the yarns A in a preform shape (FIG. 1). The contactless preheater 21 has a casing 22 with lid 22A concurrently defining an inner cavity 22B. For example, the casing 22 may be 300 mm-long chamber opened at both ends. The inner cavity 22B incorporates heating elements 23, which are located in a top portion of the cavity 22B of the casing 22 so as to be above the yarns A circulating in the casing 22. The heating elements 23 may be any appropriate type of heater. In an embodiment, the heating elements 23 are finned strip heaters. The finned strip heaters may provide radiative heating and may be electrically powered, among powering possibilities. According to an embodiment, the finned strip heaters may have a radiant flux up to 725 W/m$^2$, under 120V powering, enabling heating of up to 595° C. This is provided as a non-exhaustive example of a contactless heater of suitable capacity for preheating the preform.

The heating elements 23 may be mounted to the casing 22 by way of a height adjustment mechanism 23A (for example, nuts on bolts). The height adjustment mechanism 23A allows the adjustment of the heating elements 23 to be closer or farther to the preform passing through the inner cavity 22B of the casing 22. Thermocouples 24 may also be provided in the inner cavity 22B of the casing 22 in order to measure the temperature of operation in the contactless preheater 21 to assist in maintaining conditions leading to the uniform and gradual preheat of the preform. According to an embodiment, the thermocouples 24 are located in a bottom of the inner cavity 22B, although other locations are contemplated. A thermocouple may be curved down towards the preform to acquire the temperature of the air close to the fibers. Another thermocouple may be positioned between the two heater elements 23 and used as a control thermocouple.

An upstream sub-module of the pre-heating module 20 may be a contact preheater 25 as shown in FIGS. 2 and 4. As shown in FIG. 4, the contact preheater 25 has a casing 26 with lid 26A concurrently defining an inner cavity 26B. Holes 26C are defined in side walls of the casing 26 (FIG. 4) in order to support contact heating elements. According to an embodiment, the contact preheater 25 has three heated cylinders 27. The heated cylinders 27 may be electrically powered, to provide for example up to 400 W of heat (e.g., diameter of 19 mm). The cylinders 27 may be arranged to form a chicane by which both sides of the preform will be in contact with the heated cylinders 27, while being pressed against the cylinders 27 by the action of the pulling mechanism 50. Other geometries are possible, including having the cylinders 27 lie in a common plane with the preform zigzagging between the cylinders 27. As depicted in FIG. 2, the preform yarns go under the first cylinder 27, over the second cylinder 27 and under the third cylinder 27 of the contact preheater 25 to achieve a good contact between the fibers and the cylinder 27, being pre-heated in the process. The arrangement is such that the preform may contact the first cylinder 27 and the third cylinder 27 over 45°, while the centrally located second cylinder 27 may be in contact with the preform over 90°. The cylinders 27 may be fixed to the casing 26 so as not to rotate. For this purpose, the holes 26C may have slots for the cylinders 27 to be keyed. The cylinders 27 may be hollow cartridges of suitable heat-transfer properties (e.g., a metal) receiving therein heating elements or heating fluids. Such cylinders could also rotated, and could have different shapes as well, such as oval cigar-like shape.

Therefore, at the exit of the pre-heating module 20, the preform is heated to the point where the thermoplastic resin is in a near-liquid state, with high enough viscosity for the preform to remain integral, without significant dripping of the resin from the preform, without significant flowing to impregnate the reinforcement fibers. Therefore, the preform enters the impregnation module 30 to be further heated and consolidated into a pultruded beam.

Referring to FIGS. 2 and 5-7, the impregnation module 30 is shown having a pair of pultrusion dies with a vacuum die therebetween, although it is possible to provide the system 10 with a single one of the pultrusion dies 31. Moreover, in supplement to the arrangement of FIGS. 2 and 6-7, the impregnation module may have a cascade of N pultrusion dies 31 separated by N−1 vacuum dies 35 (e.g., N=3 or more). The pultrusion dies may have a similar construction and are therefore both shown as 31. For simplicity, the pultrusion dies 31 are described concurrently, with distinctions between the upstream pultrusion die and the downstream pultrusion die being described herein when present.

Figure 5:
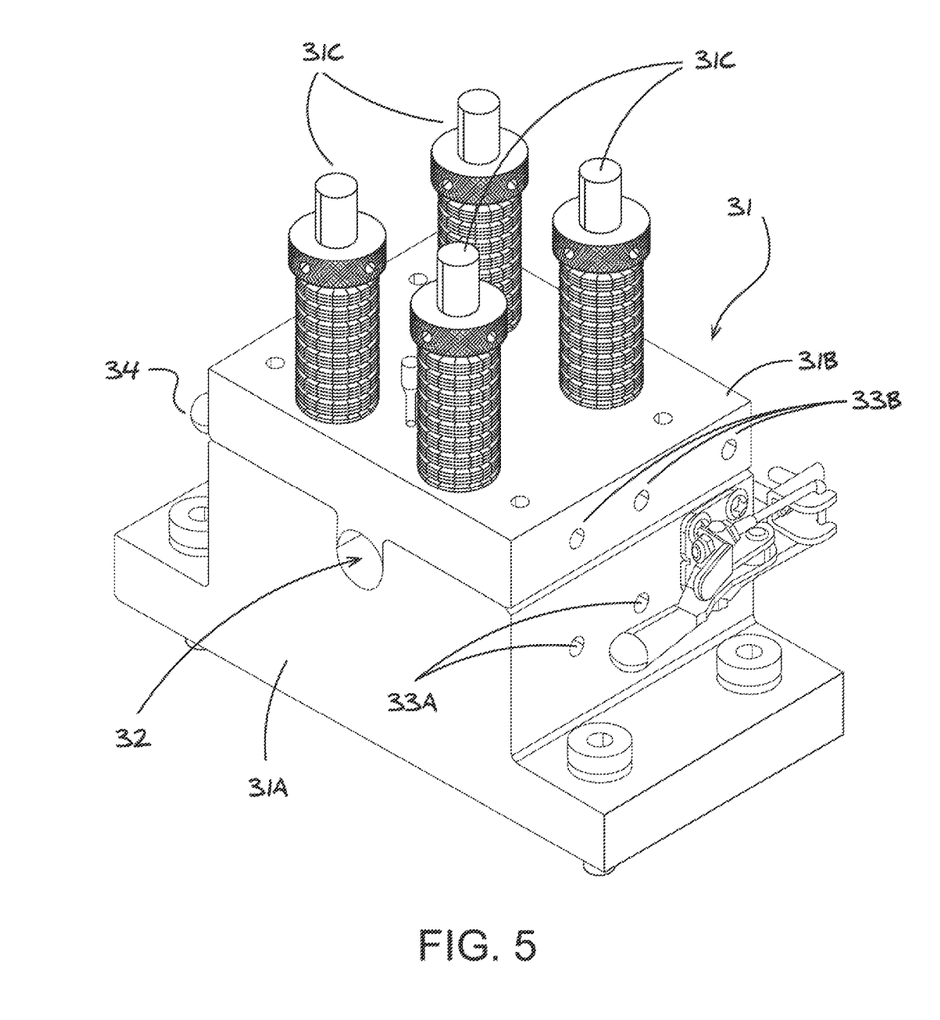
FIG. 5 is a perspective view of a pultrusion die of the pultrusion system of FIG. 1.
Figure 6:
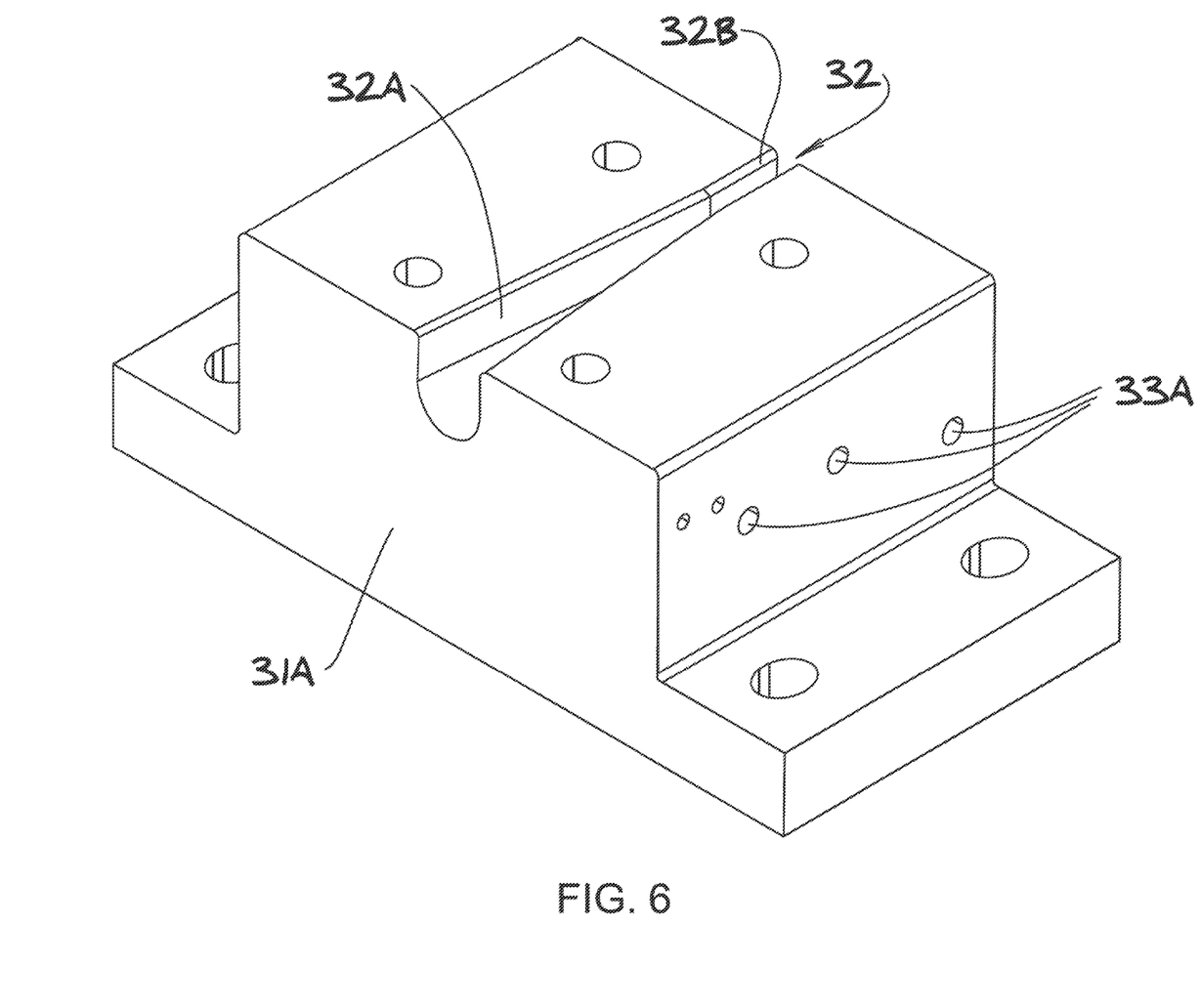
FIG. 6 is a perspective view of a base of the pultrusion die of FIG. 5.
Figure 7:
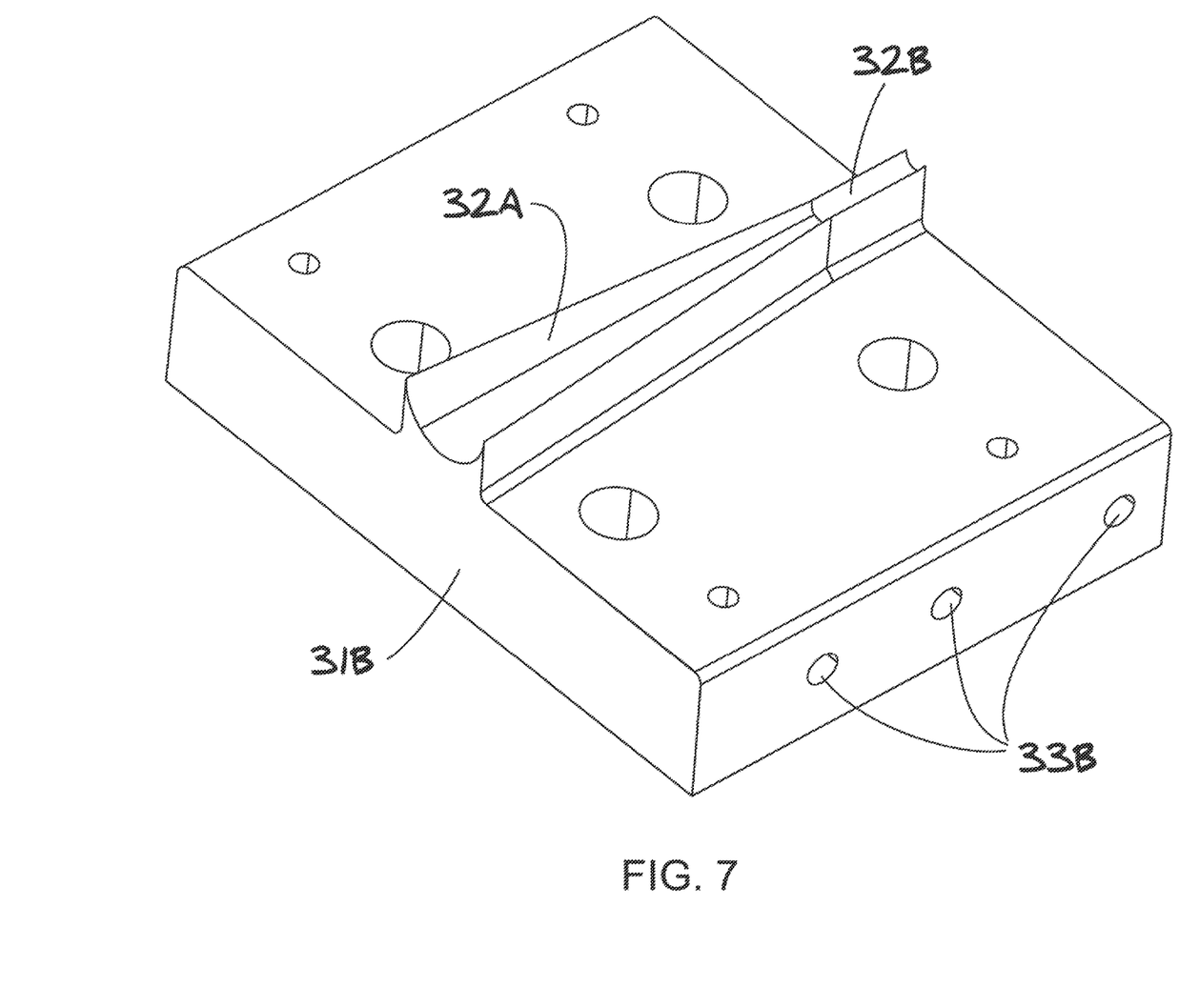
FIG. 7 is a perspective view of a cover of the pultrusion die of FIG. 5.

As shown in FIGS. 5-7, the pultrusion dies 31 may consist of a base 31A and a cover 31B, concurrently forming a tapering channel 32. The base 31A forms a female portion of the tapering channel 32, whereas the cover 31B forms the male portion of the tapering channel 32 (channel portions of the female portion and male portion being mirror images of one another so as not to impede movement of the fibers). However, the reverse arrangement is possible as well. Moreover, another configuration is considered, in which there is no mating engagement, the channel halves simply being mirror images of one another. The mating configuration is however well suited for the pultrusion application, considering the pressures that will be applied to the pultrusion dies 31 by the pulling mechanism 50 (FIG. 1) and the preform pressing against the surfaces of the tapering channel 32. Therefore, suitable locking devices 31C may be used to clamp the cover 31B to the base 31A and thus prevent or limit any relative movement between them during the pultrusion process.

In an embodiment, the tapering channel 32 has a circular section, such that the pultruded beam is a rod. The tapering channel 32 may therefore have a frustoconical channel portion 32A or like tapering channel portion, followed up by a straight channel portion 32B downstream of the frustoconical channel portion 32A. The tapering channel portion 32A is longer than the straight channel portion 32B, as the tapering is gradual to produce a change in sectional dimensions of the preform. For example, the tapering of the tapering channel portion 32A is between 2° and 6°, with the tapering channel portion 32A constituting roughly 80% of the overall length of the tapering channel 32, the straight channel portion 32B taking up the remaining 20% of length. The 2°-6° range represents the angle of the tapering wall relative to a central axis of the tapering channel portion 32A. The range between 2° and 6° is merely provided as an example at which the pultrusion method can suitably involve natural fibers. However, larger angles can be present, for instance up to 45°, and different shapes (other than cone) can be used such as ellipsoidal, rounded polymers, rounded cone, among possibilities. One difference between the similar dies 31 is the smaller size of the tapering channel 32, in a downstream direction of the pultrusion process. According to an embodiment, the diametrical dimensions are 2.5% smaller in the downstream die 31. For example, the upstream pultrusion die 31 may have final diameter larger by 5 mm than the downstream pultrusion die 31, to let additional resin flow into the downstream pultrusion die 31, for overfilling purposes.

The base 31A and the cover 31B are made of materials having suitable heat-transfer properties (e.g., a metal) as they must transmit heat to the preform passing in the tapering channel 32. According to an embodiments, the base 31A and cover 31B have bores 33A and 33B in their side walls, to form continuous bores extending through the pultrusion dies 31, to receive heating elements 34 therein (FIG. 2), or heating fluids by forming a fluid circuit including the bores 33A and 33B. The heating elements 34 or heating fluid in the bores 33A and 33B will heat the base 31A and cover 31B, in such a way that the preform in the tapering channel 32 is heated by the surfaces of the tapering channel 32. Other bores may also be used for thermocouples 34B, to monitor the temperature in the module. In FIG. 2, there are heating elements 34 positioned in horizontal orientation. It is also considered to position the heating elements 34 vertically, or in any other appropriate orientation to heat the preform in the tapering channel 32. In an embodiment, 120V or 240V electric heating cartridges are used, capable of producing 350 W/m² for example. In another embodiment, external heating plates can be used over and under the cover 31B and the base 31A. The heating by the dies 31 allows the thermoplastic matrix to reach a sufficiently low viscosity. The temperature reached may be above the melting temperature of the thermoplastic for this purpose.

In an embodiment, the system 10 has a single-die impregnation module 30 with a single one of the pultrusion dies 31. For example, the single pultrusion die 31 may be 76 mm long, with a 5° taper in the tapering channel portion 32A, followed by the straight channel portion 32B being for example 20 mm long with a 4.78 mm constant diameter.

Figure 8:
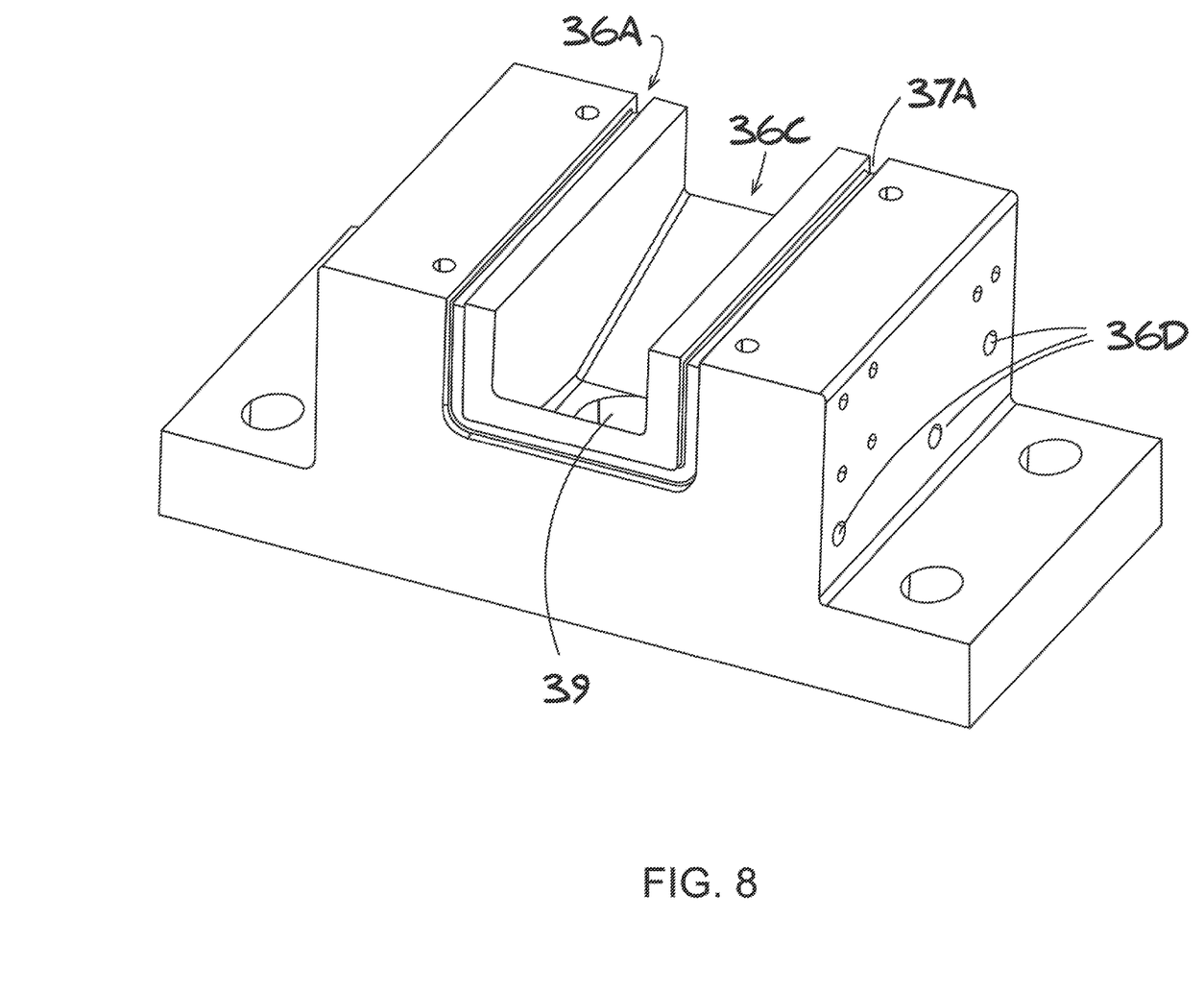
FIG. 8 is a perspective view of a base of a vacuum die of the pultrusion system of FIG. 1.
Figure 9:
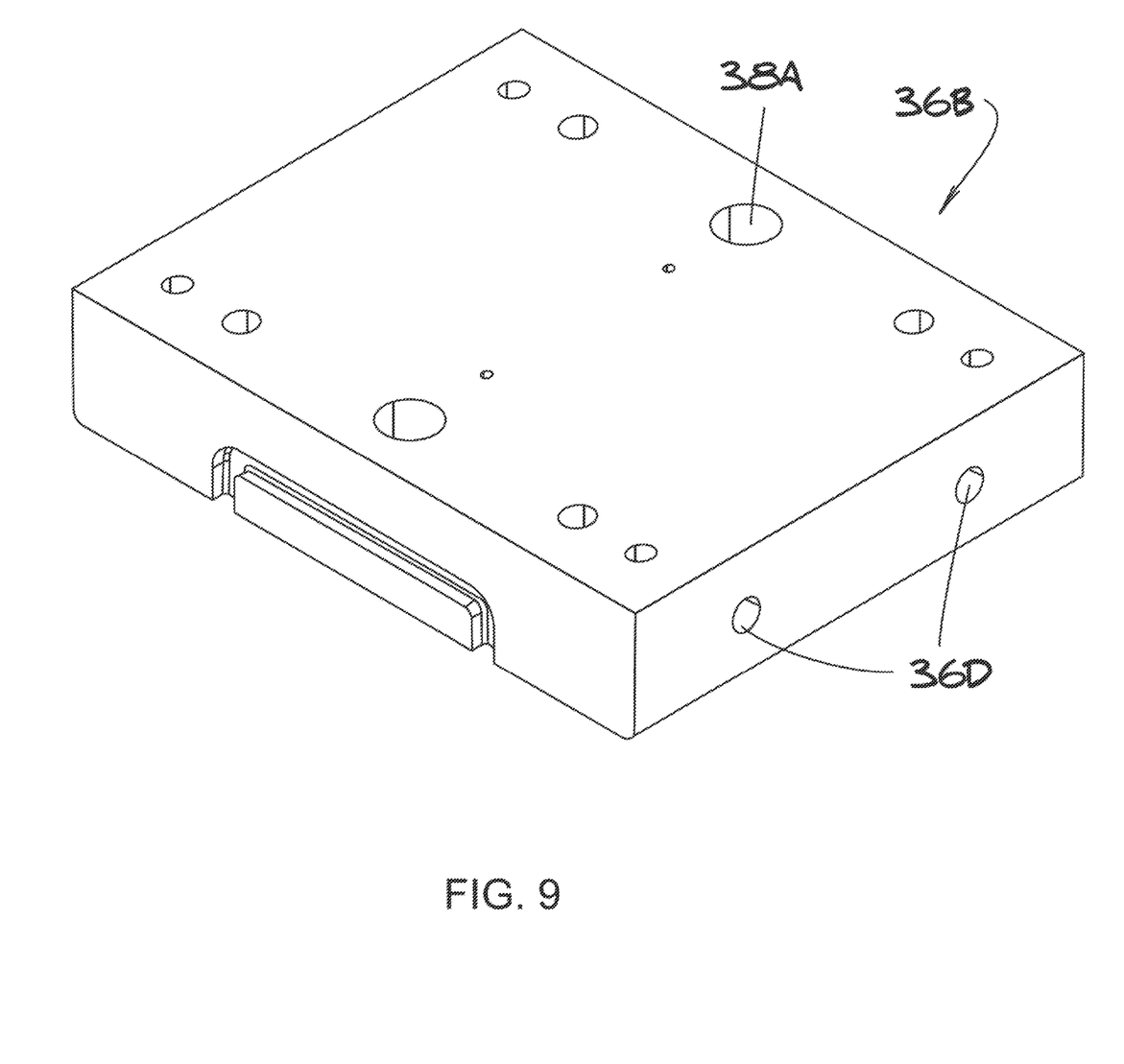
FIG. 9 is a perspective view of a lid of the vacuum die of the pultrusion system of FIG. 1.

Referring concurrently to FIGS. 2, 8 and 9, the vacuum die is generally shown at 35. The vacuum die 35 is positioned between the upstream and downstream pultrusion dies 31. According to an embodiment, the vacuum die 35 is hermetically connected to the pultrusion dies 31 so as to create a vacuum chamber for the preform transiting from the upstream pultrusion die 31 to the downstream pultrusion die 31. The vacuum die 35 has a base 36A and lid 36B hermetically connected to one another, and concurrently forming a vacuum chamber 36C sufficiently large so as not to come into contact with the preform. The vacuum die 35 may have any appropriate length to sufficiently expose the preform to the vacuum effect, and may be in accordance to an exemplary embodiment 100 mm long. Seal channels may be present peripherally around the vacuum chamber 36C, such as seal channels 37A and 37B. The seal channels 37A and 37B extend to the end faces of the base 36A and lid 36B, respectively, for seals therein to sealingly contact the end face of the adjacent pultrusion dies 31. Other sealing arrangements are considered, with seals on the pultrusion dies 31, or by way of mating engagement between the pultrusion dies 31 and the vacuum die 35. Moreover, during the pultrusion process, there is overfilling of the resin of the thermoplastic matrix at the upstream pultrusion die 31. The overfilling essentially plugs the material inlet in the upstream pultrusion die 31 with resin, whereby the communicating inner cavities of the pultrusion dies 31 and the vacuum die 35 are sealed at the inlet and outlet of the assembly by the preform and beam.

As observed from FIGS. 8 and 9, some bores 36D may be provided in the side walls of the base 36A and the lid 36B, for receiving heating elements 36E or heating fluids, and therefore heat the vacuum die 35 for same not to cool the heated preform passing through the vacuum chamber 36C. The vacuum die 35 may indeed be kept at a temperature above the melting temperature. Other bores may also be used for thermocouples, to monitor the temperature in the module. According to an embodiment, the heating elements are 120V or 240V electric heating cartridges, capable of producing 350 W/m² for example, for compatibility with the heating cartridges of the pultrusion dies 31, and therefore ease of maintenance and inventory management. However, other heating components are considered as well.

As concurrently shown in FIGS. 2 and 9, a vacuum port(s) 38A is defined in the lid 36B and is connected to a vacuum pump or like suction source, so as to create a vacuum effect (negative relative pressure) in the sealed vacuum chamber 36C. Another port may be present, for instance for a pressure sensor to be used to monitor the pressure in the vacuum chamber 36C. Referring to FIG. 8, the base 36A may have a drain configuration, with slanted surface and a drain hole

39. The drain hole 39 may be used with a detachable container to collect any resin dripping from the preform due to the vacuum effect and/or the temperature relative to the resin in the liquid state. The resin collected by the drain hole 39 may result from a flowback occurring at the die downstream of the vacuum chamber 35.

Figure 10:
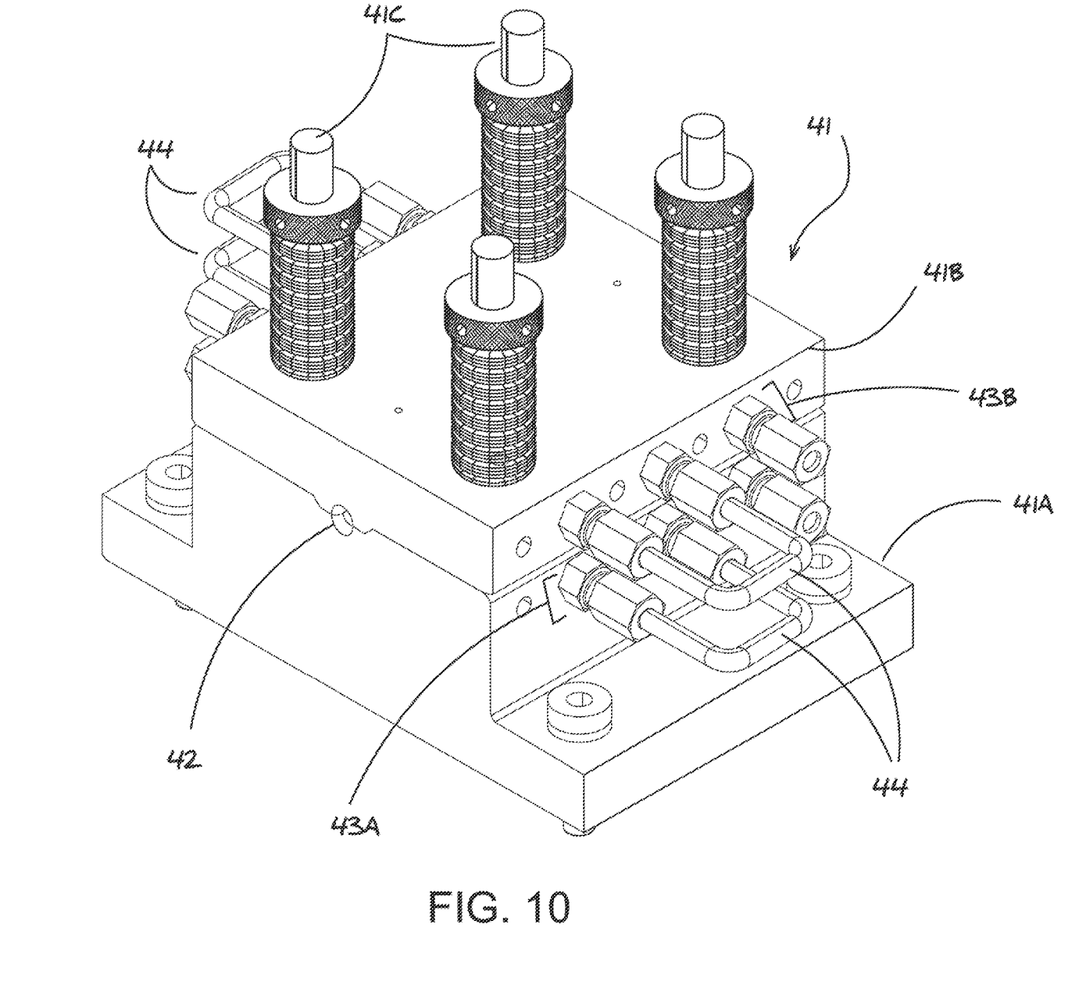
FIG. 10 is a perspective view of a cooling die of the pultrusion system of FIG. 1.
Figure 11:
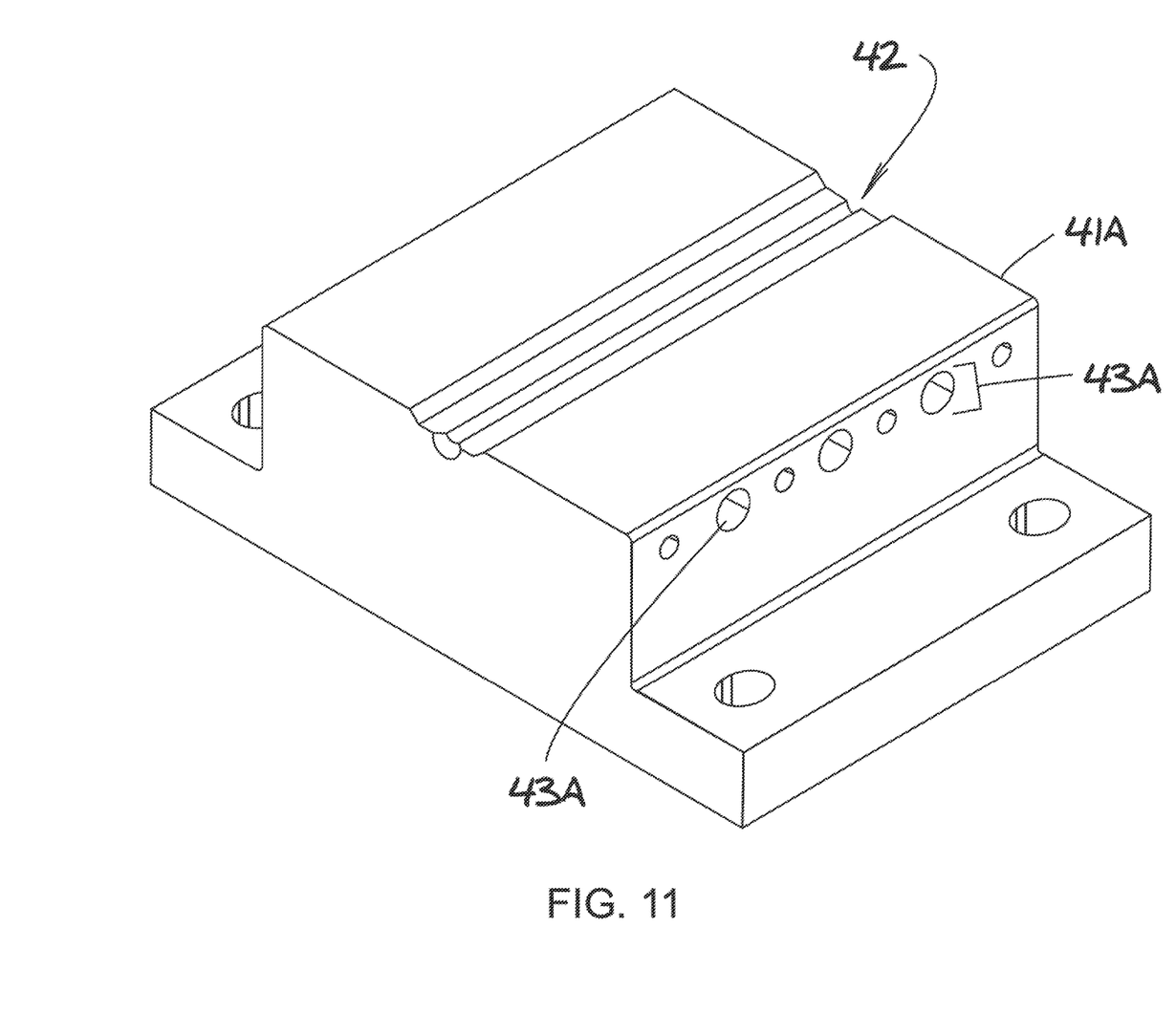
FIG. 11 is a perspective view of a base of the cooling die of FIG. 10.

Referring to FIGS. 10 and 11, the cooling module 40 is shown as having a cooling die 41. The cooling die 41 may have a similar construction to that of the other components of the system 10, with a base 41A and a cover 41B, concurrently forming a cooling channel 42. The base 41A forms a female portion of the cooling channel 42, whereas the cover 41B forms the male portion of the cooling channel 42 (channel portions of the female portion and male portion being mirror images of one another so as not to impede movement of the fibers)—the reverse arrangement being possible as well. Moreover, another configuration is considered, in which there is no mating engagement, the channel halves simply being mirror images of one another. Suitable locking devices 41C are used to clamp the cover 41B to the base 41A and thus prevent any relative movement between them during the pultrusion process.

In an embodiment, the cooling channel 42 has a circular section, like other components of the system 10. Likewise, the components of the system 10 may produce beams in a variety of cross-sections, including square, rectangular, polygonal, oval, U, I, just as examples. The base 41A and the cover 41B are made of materials having suitable heat-transfer properties (e.g., a metal) as they must cool the beam passing in the cooling channel 42. According to an embodiments, the base 41A and cover 41B have bores 43A and 43B in their side walls, to form bores extending through the cooling die 41, to receive cooling elements 44 therein (FIG. 2), or cooling fluids. Other bores may also be used for thermocouples, to monitor the temperature in the module. The cooling elements 44 (e.g., fluid coils for cooling fluid) in the bores 43A and 43B will heat the base 41A and cover 41B, in such a way that the preform in the cooling channel 42 is cooled by the surfaces of the channel 42. In an embodiment, the cooling elements 44 are 120V or 240V electric heating cartridges are used, capable of producing 450 W/m$^2$ for example. While the expression cooling is used, the cooling die 41 must be heated above ambient conditions, as the cooling of the pultruded beam is achieved at temperatures below those involved in the impregnation module 30, but nonetheless higher than ambient temperatures.

Although different dimensions are possible, the cooling die is a 140 mm long segment with a constant diameter of 4.78 mm, to be put in perspective with the dimensions of the other preform passages of the system 10.

The pulling mechanism 50 is located at the outlet of the cooling module 40 to exert the pulling action on yarns A. The pulling mechanism 50 may have any appropriate embodiment. For example, the pulling mechanism 50 may include multiple pairs of opposing rollers (FIG. 1) between which the pultruded beam is squeezed. The superior rollers may be actuated by an electric motor, the inferior ones are free wheels, or vice-versa. A rotary encoder may be used to monitor the pultrusion speed. Load cells may also be placed between the pulling mechanism 50 and the module 40 of the system 10 to measure the pulling force on the beam.

The temperature control of the system is achieved by the multiple thermocouples inserted into blind bores described above. These sensors are connected to a computer through the data acquisition module.

In operation, the yarns A are continuously pulled by the pulling mechanism 50, through the various modules of the system 10. The thermoplastic matrix and natural fibers or synthetic fibers are gradually and uniformly pre-heated in the pre-heating module 20, to approach impregnation temperatures, at which the viscosity of the resin of the thermoplastic matrix will be at or near its minimum. The preheating initiating the impregnation and lowering void content in the preform. In the impregnation module 30, the preform reaches this impregnation temperature, while being exposed to a reduction in diameter. There results a consolidating pressure in the resin, by which the resin will impregnate the natural fibers. The impregnation of the natural fibers is the soaking and saturating of the natural fibers with the resin, with resin penetration between fiber filaments. It is observed that the system 10 allows impregnation without air pressure beyond ambient. The intervening step of vacuuming the preform, in the vacuum die 35, between the two reductions in diameter of the pultrusion dies 31, allows removal of air from the resin heated to low or minimum viscosity, and likely the deconsolidation of the preform. The deconsolidation preform has air-evacuation pathways to facilitate air removal from the pre-form. The removal of air, and the subsequent expose to diameter reduction while impregnation temperatures are maintained, allows the beam to reach a desired cross-sectional diameter, with reduced air content (less than 10%). The cooling of the resulting beam allows same to stabilize into its resulting dimension and shape.

Stated differently, a method for pultruding a beam comprises continuously pulling on a preform of yarns including thermoplastic matrix and natural fibers. While continuously pulling, the preform is sequentially pre-heated, passed through a first pultrusion die 31 having a tapering channel 32 heated such that the preform reaches a desired low viscosity temperature for resin in the thermoplastic matrix to impregnate the natural fibers, passed in a vacuum cavity of the vacuum die 35 heated to a low viscosity temperature of the preform to remove air therefrom, passed through a second pultrusion die 31 having a tapering channel 32 heated such that the preform is at the desired low viscosity temperature for resin in the thermoplastic matrix to further impregnate the natural fibers to output a beam. The beam is then cooled. There results a pultruded beam comprising a thermoplastic matrix reinforced with natural fibers, the pultruded beam having a void percentage lower than 10% of an overall volume of the pultruded beam, and further wherein the natural fibers constitute between 40% and 60% of an overall volume of the pultruded beam.

Other than the use of the pultruded beams directly as components, other uses for the pultruded beams include pultruded insert overmolded with thermoplastic resin, injection precursor with oriented pellets, and compression molding precursor, with oriented strands, for instance to form panels incorporating randomly oriented stands.

EXEMPLARY EMBODIMENT

The method described above, as operated in the system 10, was performed to produce a pultruded beam having a void percentage lower than 10% of an overall volume of the pultruded beam, with a content of natural fibers between 40% and 60% of the overall volume of the pultruded beam, using a combination of flax and polypropylene. By way of non-limiting example, the pultruded beam was created using flax (e.g., ROVING TEX 200 Natural by Safilin). The flax fibers were in the form of 200 tex staple fiber yarn, with 68 yarns used. The polypropylene (PP) was 900D raw white normal tenacity pp yarn, from Guangzhou Lanjing Chemical Fiber Co. Ltd. The polypropylene was in the form of a multi-filament yarn with 72 filaments and 900 deniers, with 90 yarns used. The pre-heating temperature was 155° C., the pultrusion die temperature was 200° C., and the cooling die temperature was 35° C. The pultrusion speed was 50 mm/min.

The invention claimed is:

1. A system for pultruding a beam comprising:
a pulling mechanism continuously pulling on a preform of yarns including a thermoplastic matrix and fibers, the pulling mechanism being in a downstream location in the system; and
a sequence of
a pre-heating module to pre-heat the preform,
a first die having a tapering channel portion heated such that the preform reaches a desired low viscosity temperature for resin in the thermoplastic matrix to impregnate the fibers,
a vacuum module having a vacuum cavity to remove air from the preform exiting the first die,
at least a second die having a tapering channel portion heated such that the preform is at the desired low viscosity temperature for resin in the thermoplastic matrix to further impregnate the fibers, and
a cooling module to cool the beam before the beam reaches the pulling mechanism,
wherein the second die tapers to a smaller final cross-section than a final cross-section of the first die.

2. The system according to claim 1, wherein the pulling mechanism comprises at least a pair of rollers on opposite sides of the beam.

3. The system according to claim 1, wherein the pre-heating module includes a contactless heater.

4. The system according to claim 1 wherein the pre-heating module includes a contact heater in which the preform contacts at least one heating element.

5. The system according to claim 4, wherein the at least one heating element includes at least one cylindrical heating element against which the preform is put in contact.

6. The system according to claim 1, wherein at least one of the first die and the second die has a taper in a range of 2° to 6° from a central axis of the tapering channel portion.

7. The system according to claim 1, wherein at least one of the first die and the second die includes a straight channel portion downstream of the tapering channel portion.

8. The system according to claim 1, wherein the system has a final diameter smaller in cross-section in the second die than in the first die.

9. The system according to claim 1, wherein a downstream portion of the first die and an upstream portion of the second die are in sealing engagement with the vacuum module to seal the vacuum cavity.

10. The system according to claim 1, wherein the system comprises N of the dies for N−1 of the vacuum module, wherein N=at least two.

11. The system according to claim 1, further comprising the fibers being natural fibers.

12. The system according to claim 1, further including a preform of yarns including a thermoplastic matrix and fibers.

* * * * *